United States Patent [19]
Bross

[11] Patent Number: 5,288,090
[45] Date of Patent: Feb. 22, 1994

[54] DOOR DOLLY APPARATUS

[76] Inventor: Martin D. Bross, P.O. Box 1536, 5510 Little John Way, Pollock Pines, Calif. 95726

[21] Appl. No.: 18,150
[22] Filed: Feb. 16, 1993
[51] Int. Cl.$^5$ ............................ B62B 1/06; B62B 1/26
[52] U.S. Cl. ................... 280/79.7; 280/47.28; 280/35; 269/905
[58] Field of Search ................. 280/35, 47.18, 47.19, 280/47.26, 47.28, 47.29, 79.7; 269/17, 905; 135/66, 85

[56] References Cited

U.S. PATENT DOCUMENTS

| | | | |
|---|---|---|---|
| D. 310,894 | 9/1990 | Smith | 280/79.7 X |
| 897,853 | 9/1908 | Vom Scheidt | 280/79.7 X |
| 2,778,515 | 1/1957 | Hanson | 280/47.19 X |
| 4,050,671 | 9/1977 | Coleman | 269/17 X |
| 4,114,915 | 9/1978 | Lello et al. | 280/47.19 |
| 4,138,099 | 2/1979 | Englehart | 269/17 |
| 4,141,192 | 2/1979 | Augustine | 269/905 X |
| 4,181,463 | 1/1980 | Mooney | 280/47.28 X |
| 4,268,050 | 5/1981 | Kennedy, Sr. | 280/47.19 X |
| 4,278,244 | 7/1981 | Carter | 269/17 |
| 4,746,141 | 5/1988 | Willis | 280/47.29 X |
| 4,978,132 | 12/1990 | Wilson et al. | 280/79.7 X |
| 5,056,545 | 10/1991 | Spaeth | 135/85 X |

Primary Examiner—Brian L. Johnson
Attorney, Agent, or Firm—Leon Gilden

[57] ABSTRACT

A support post mounts an axle at a first end thereof, with a handle at the other end of the support post, with a first container structure mounted adjacent the axle for use carrying a door member thereon, with a second container structure positioned adjacent the handle to receive and align the door relative to the support post. The axle having wheel members rotatably mounted thereto permits ease of manipulation of the door positioned upon the apparatus.

2 Claims, 4 Drawing Sheets

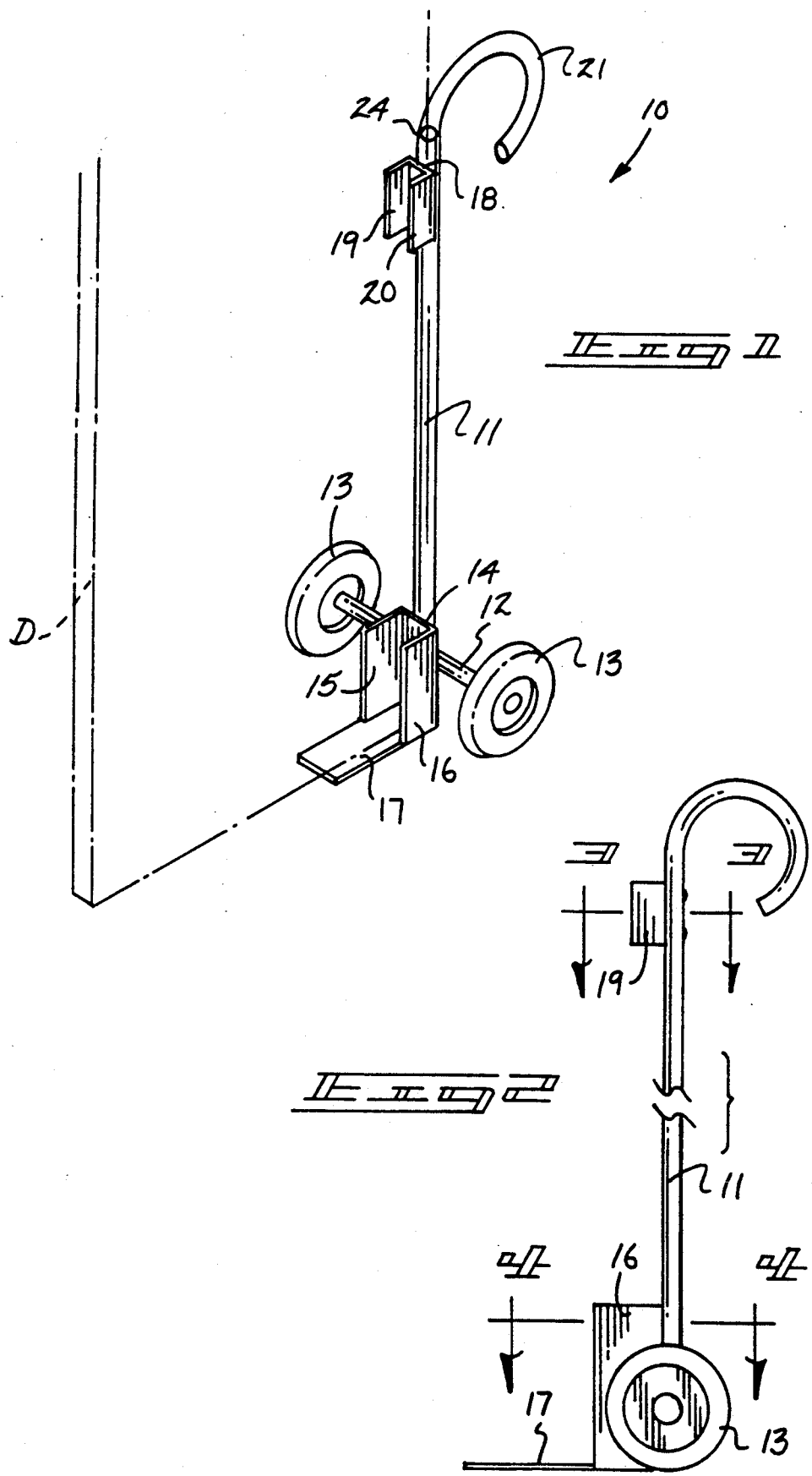

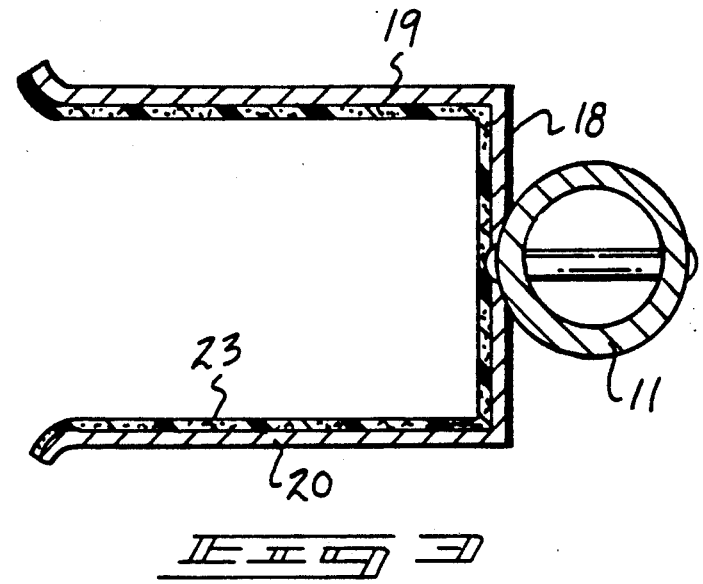
FIG 3
FIG 4
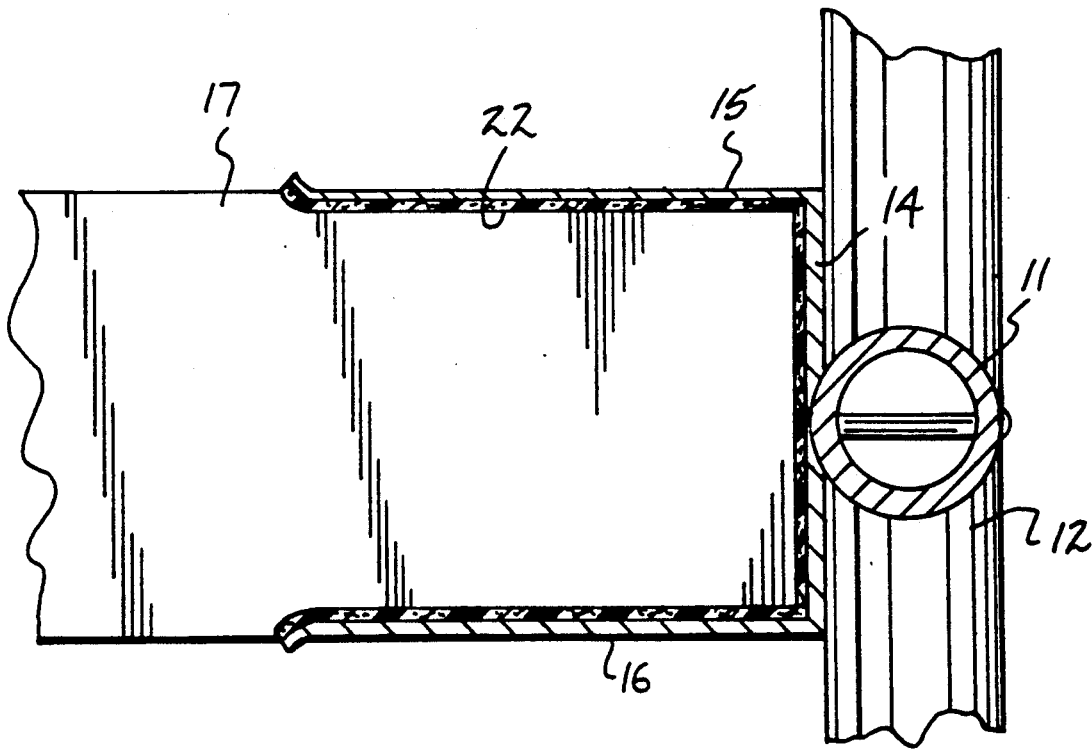

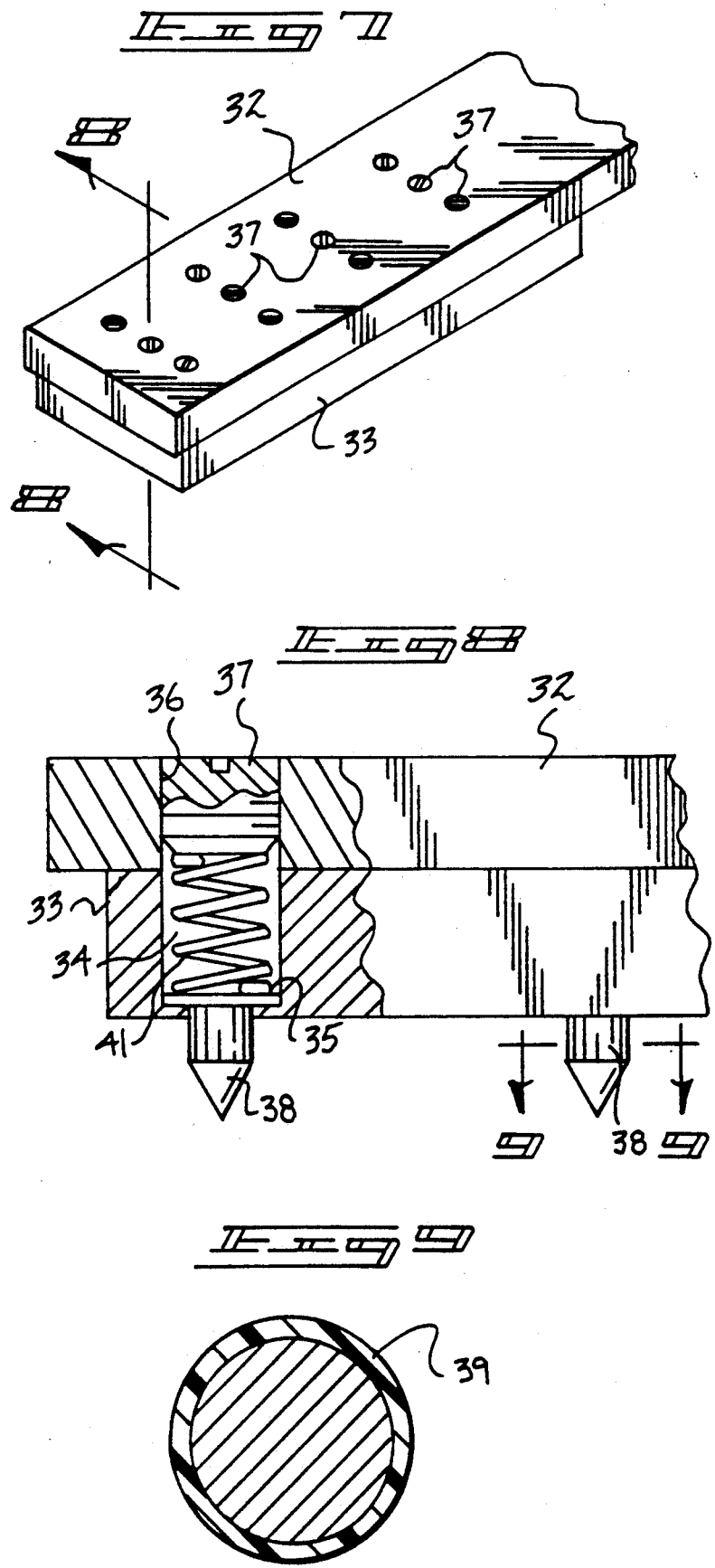

DOOR DOLLY APPARATUS

BACKGROUND OF THE INVENTION

1. Field of the Invention

The field of invention relates to dolly apparatus, and more particularly pertains to a new and improved door dolly apparatus wherein the same is arranged for the manipulation of a door member.

2. Description of the Prior Art

Dolly structure of various types have been utilized throughout the prior art such as indicated by the U.S. Pat. Nos. 4,458,906; 5,028,062; 4,277,075; and 4,178,006.

The instant invention attempts to overcome deficiencies of the prior art by employing a dolly structure arranged for the particular and specialized accommodation of a door member to permit ease of manipulation of a door member and in this respect, the present invention substantially fulfills this need.

SUMMARY OF THE INVENTION

In view of the foregoing disadvantages inherent in the known types of dolly apparatus now present in the prior art, the present invention provides a door dolly apparatus wherein the same is arranged to include a plurality of aligned support containers to receive and position a door member relative to a dolly structure to ease manipulation of the door member. As such, the general purpose of the present invention, which will be described subsequently in greater detail, is to provide a new and improved door dolly apparatus which has all the advantages of the prior art dolly apparatus and none of the disadvantages.

To attain this, the present invention provides a support post mounting an axle at a first end thereof, with a handle at the other end of the support post, with a first container structure mounted adjacent the axle for use in transporting with a door member thereon, with a second container structure positioned adjacent the handle to receive and align the door relative to the support post. The axle having wheel members rotatably mounted thereto permits ease of manipulation of the door positioned upon the apparatus.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved door dolly apparatus which has all the advantages of the prior art dolly apparatus and none of the disadvantages.

It is another object of the present invention to provide a new and improved door dolly apparatus which may be easily and efficiently manufactured and marketed.

It is a further object of the present invention to provide a new and improved door dolly apparatus which is of a durable and reliable construction.

An even further object of the present invention is to provide a new and improved door dolly apparatus which is susceptible to a low cost of manufacture with regard to both materials and labor, and which accordingly is then susceptible to low prices of sale to the consuming public, thereby making such door dolly apparatus economically available to the buying public.

Still yet another object of the present invention is to provide a new and improved door dolly apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention in use.

FIG. 2 is an orthographic side view of the invention.

FIG. 3 is an orthographic view, taken along the lines 3—3 of FIG. 2 in the direction indicated by the arrows.

FIG. 4 is an orthographic view, taken along the lines 4—4 of FIG. 1 in the direction indicated by the arrows.

FIG. 7 is an enlarged isometric illustration of section 7 as set forth in FIG. 5.

FIG. 8 is an orthographic view, taken along the lines 8—8 of FIG. 7 in the direction indicated by the arrows.

FIG. 9 is an orthographic view, taken along the lines 9—9 of FIG. 8 in the direction indicated by the arrows.

DESCRIPTION OF THE PREFERRED EMBODIMENT

Figure 5:
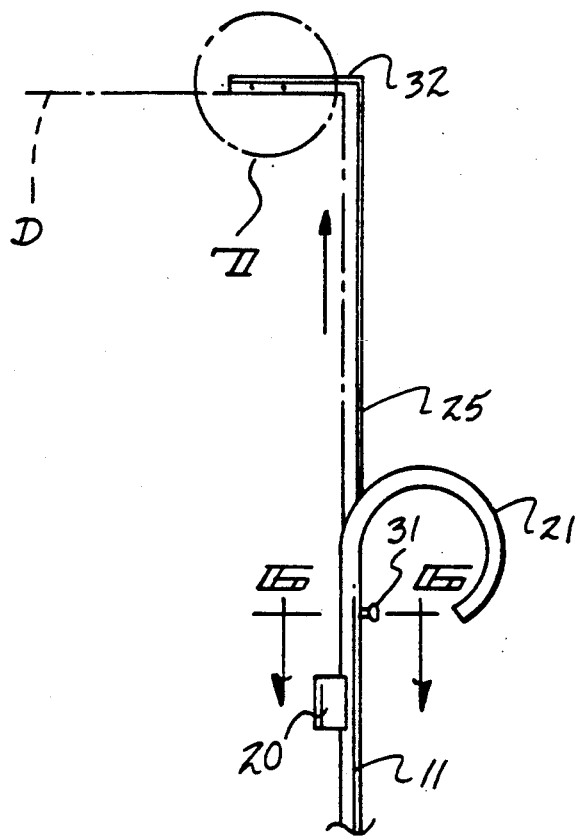
FIG. 5 is an orthographic view of the apparatus employing a securement means relative to an uppermost end of the door structure.
Figure 6:
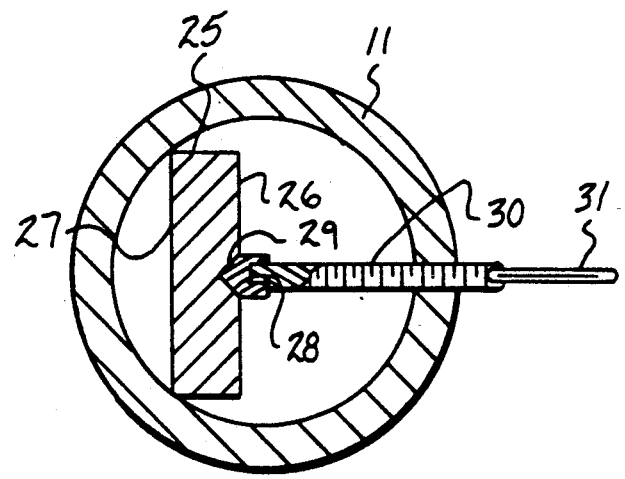
FIG. 6 is an orthographic view, taken along the lines 6—6 of FIG. 5 in the direction indicated by the arrows.

With reference now to the drawings, and in particular to FIGS. 1 to 9 thereof, a new and improved door dolly apparatus embodying the principles and concepts of the present invention and generally designated by the reference numeral 10 will be described.

More specifically, the door dolly apparatus 10 of the instant invention essentially comprises a support post 11 fixedly mounting an axle 12 of the support post adjacent a lowermost end of the support post, with the axle 12 mounting rotatably a plurality of wheel members 13 at opposed distal ends of the axle 12. A first container structure is provided in adjacency to the lowermost end of the support post, having a first wall 14 mounted to the support post 11 orthogonally oriented relative to the axle 12 and positioned intermediate the wheel members 13, with the first wall 14 further including respective second and third walls 15 and 16 orthogonally mounted in a coextensive relationship relative to the first wall 14, with the second and third walls 15 and 16 mounted to opposed ends of the first wall, having the second and third walls 15 and 16 in a parallel coextensive relationship relative to one another. A floor plate 17 orthogonally oriented relative to the first, second, and third walls 14, 15, and 16 respectively extends beyond the second and third walls 15 and 16 for the support of a lowermost end of a door member 12, as indicated in FIG. 1.

A second container structure is provided adjacent an uppermost end of the support post 11, with the second container structure having a fourth wall 18 coplanar to the first wall 14, with respective fifth and sixth walls 19 and 20 orthogonally oriented relative to the fourth wall 18 at opposed sides of the fourth wall. The fifth wall 19 is coplanar with the second wall 15 and the sixth wall 20 coplanar with the third wall 16 to provide for a U-shaped container structure to receive the side end of a door therewithin for alignment of the door relative to the first container structure. An arcuate handle 21 extends from the support post 11 at the second container structure for ease of manual manipulation of the organization in use. It should be further noted, as indicated in FIGS. 3 and 4, that a first cushion liner 22 is mounted coextensively relative to the first, second, and third walls 14, 15, and 16, with a second cushion liner 23 coextensive with the fourth, fifth, and sixth walls 18, 19, and 20 to prevent marring of the door when positioned upon the organization.

A support post opening 24 is optionally provided, as indicated in FIG. 1, to slidably and telescopingly receive a slide bar 25 therewithin through and parallel to the support post 11 within the support post 11. The slide bar 25 includes a first wall 26 parallel and coextensive to a second wall 27, with the first wall 26 having a groove 28 coextensive with the first wall 26. A lock rod 30 is orthogonally oriented relative to the first wall 26 threadedly directed through the support post 11, having a groove engaging head 29 positioned within the support post rotatably mounted to a first end of the lock rod 30 and received within the groove 28 to effect locking of the slide bar 25 in a predetermined longitudinal relationship relative to the support post 11. The lock rod 30 includes a lock rod handle 31 positioned exteriorly of the support post 11 for ease of rotation of the lock rod to engage the groove engaging head 29 within the associated groove 28.

The slide bar 25 fixedly and orthogonally mounts a slide bar engaging plate 32 at an uppermost distal end of the slide bar in an orthogonal relationship, with the slide bar engaging plate having a mounting block 33 mounted to a bottom surface of the slide bar engaging plate. The mounting block 33 includes a plurality of mounting block cavities 34, with each of the cavities 34 having a cavity floor 35. The engaging plate 32 includes a plurality of engaging plate bores 36, with each of the bores 36 aligned with and in communication with one of the cavities 34. A threaded plug member 37 is threaded engaged into each of the engaging plate bores 36 to capture a spring member 41 between the threaded plug member 37 and an underlying spike member 38 having an abutment plate 40 received on the cavity floor 35 of a respective mounting block cavity 34. In this manner, tension adjustment of the spike members 38 is afforded to adjust relative engaging of the spike members 38 within an uppermost end portion of a door "D". Further, use of the spike members 38 includes a polymeric exterior covering 39 (see FIG. 9) to further prevent marring to an associated door structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A door dolly apparatus, comprising,
  a support post, the support post having a support post first end and a support post second end, with the support post including an axle orthogonally and fixedly mounted to the support post adjacent the support post first end, with the axle rotatably mounting a plurality of wheel members on opposed sides of the support post, and the support post second end having a handle extending from the support post second end, and
  a first container structure fixedly mounted to the support post adjacent the first end, and a second container structure mounted to the support post adjacent the second end, with the first container structure and the second container structure arranged to receive a door member therewithin, and
  the first container structure includes a first wall fixedly mounted to the support post intermediate the axle, and orthogonally oriented relative to the axle, and a second wall and a third wall fixedly, orthogonally, and coextensively mounted to the first wall, wherein the second wall and the third wall are oriented on opposed sides of the support post in a parallel coextensive relationship relative to one another, and a floor plate fixedly and orthogonally mounted to the lowermost end of the first wall, second wall, and the third wall in an orthogonal relationship, with the floor plate extending beyond the second wall and the third wall to provide for underlying support to a door member, wherein the second container is of a U-shaped configuration having a fourth wall coplanar with the first wall, and a fifth wall coplanar to the second wall, and a sixth wall coplanar with the third wall, wherein the fifth wall and the sixth wall are arranged in a parallel relationship relative to one another, and a first cushion liner coextensively mounted to the first wall, the second wall, and the third wall, with a second cushion liner coextensively mounted to the fourth wall, fifth wall, and sixth wall, and the support post includes a support post opening adjacent the support post second end, and a slide bar slidably and telescopingly received with the support post opening, with the slide bar having a slide bar first wall and a slide bar second wall, with the slide bar first wall and the slide bar second wall parallel relative to one another and oriented substantially parallel to the first wall and the fourth wall, with the slide bar having a slide bar groove coextensive with the first wall, and a lock rod threadedly directed through the support post orthogonally oriented relative to the first wall, wherein the lock rod includes a lock rod first end having a groove engaging head, with the groove engaging head positioned within the support post received within the groove, and the lock rod having a lock rod second end positioned exteriorly of the support post, with the lock rod second end having a handle member to ease manual rotation of the lock rod relative to the support post, and the slide bar includes a slide bar engaging plate orthogonally and fixedly mounted to the slide bar at an uppermost distal end of the slide bar, wherein the slide bar engaging plate is positioned over the floor plate in a parallel relationship, the slide bar including a mounting block fixedly mounted to a bottom surface of the engaging plate, wherein the mounting block is positioned intermediate the slide bar engaging plate and the floor plate, with the mounting block having a plurality of cavities, with each of the cavities including a cavity floor, and the slide bar engaging plate including a plurality of engaging plate bores, wherein each of the engaging plate bores is aligned and in communication with one of the mounting block cavities, and a threaded plug member threadedly received within each of the engaging plate bores, and a spike member, the spike member having a spike member abutment plate positioned upon the cavity floor, and a spring member captured between a respective one of said threaded plug members and a respective abutment plate.

2. An apparatus as set forth in claim 1 wherein each of the spike members includes a polymeric covering to afford protection to the door during transport.

* * * * *